March 23, 1937.  J. W. TATTER  2,074,710
BRAKE
Original Filed May 14, 1930
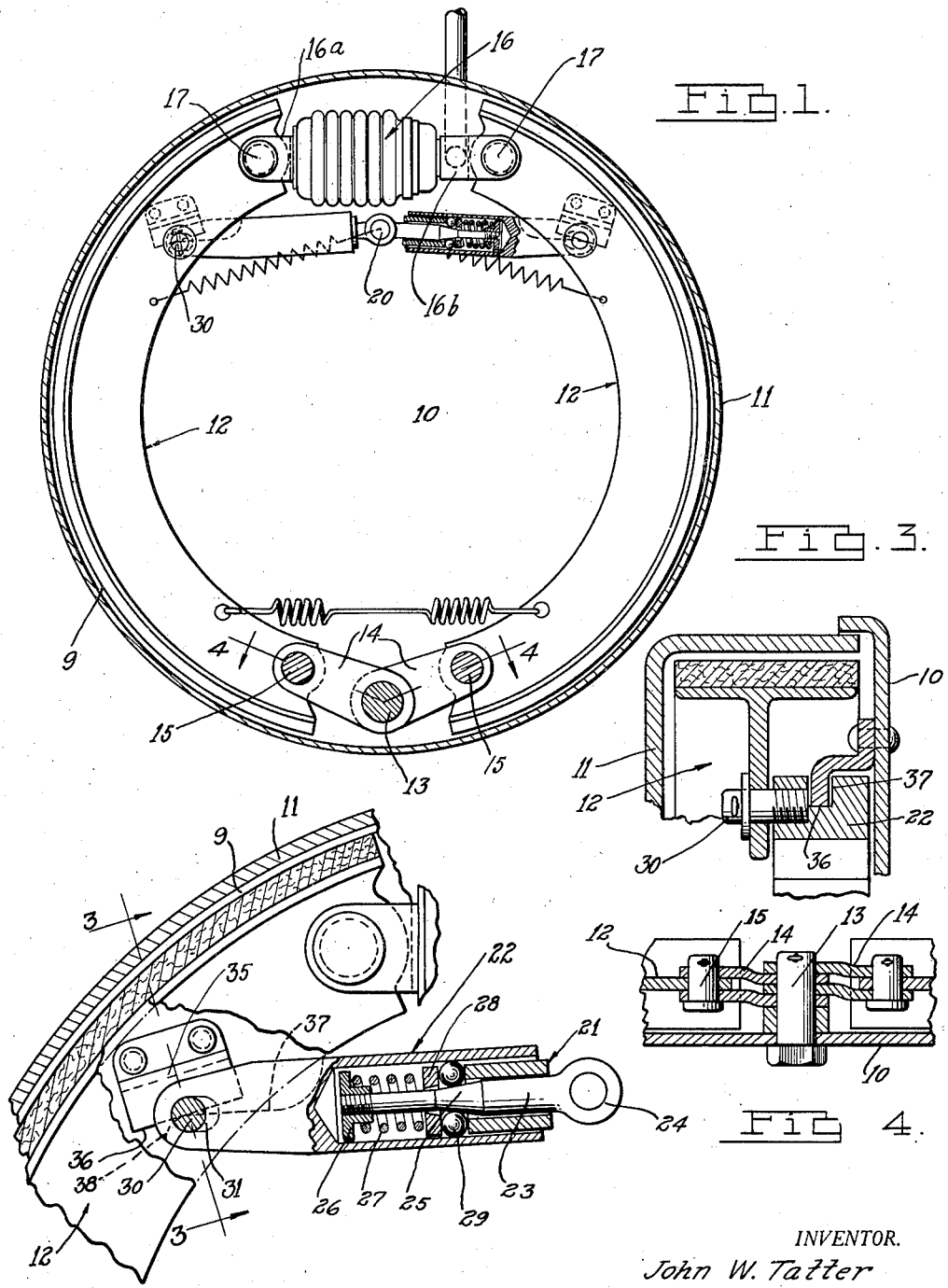
INVENTOR.
John W. Tatter
BY
ATTORNEY.

Patented Mar. 23, 1937

2,074,710

UNITED STATES PATENT OFFICE 2,074,710

BRAKE

John W. Tatter, Akron, Ohio, assignor to Bendix Products Corporation, South Bend, Ind., a corporation of Indiana Refile of abandoned application Serial No. 452,388, May 14, 1930. This application June 19, 1936, Serial No. 86,067

14 Claims. (Cl. 188—79.5)

This is a refile of my abandoned application Serial No. 452,388, filed May 14, 1930.

My invention relates to brakes and more particularly to that type of brakes adapted for use with automobile vehicles and the like, though it will be understood that the principles of my invention may be incorporated in braking mechanisms for aircraft or other types of machinery.

In the fluid type of brake as well as with a mechanically operated brake, good braking efficiency at all times may only be obtained by maintaining a constant clearance between the brake shoe means and the brake band means, or at least by maintaining an approximate constant clearance between said means. This is usually accomplished by periodically adjusting the brake mechanism and has proved to be a very unsatisfactory method, since frequent adjustment is necessary and in a great many instances the brake mechanism is not properly attended to or adjusted as frequently as necessary. As a result of this neglect many cars are operated with faulty brakes.

It is the object of my invention to facilitate the operation of brakes by providing means for automatically taking up the clearance between the brake drum means and the brake shoe means.

Another object of my invention is to facilitate the operation of brakes by providing an automatically operated clearance take up device for maintaining at all times approximately the same amount of clearance between the brake drum means and the brake shoe means, while the said means are in an inoperative position.

Further features of my invention reside in the novel means for supporting the brake shoe means, and in the means for guiding the same as the clearance between the brake drum and brake shoe means is taken up.

For a more detailed understanding of my invention, reference may be had to the accompanying drawing which illustrates one form which my invention may assume, and in which:

Fig. 1 is a view in elevation of a brake mechanism incorporating an automatically operated clearance take up device constructed in accordance with my invention, Fig. 2 is an enlarged view partly in section of the automatically operated clearance take up device, Fig. 3 is a section taken substantially on the line 3—3 of Fig. 2 showing the means for connecting the take up device with the brake shoe means, and Fig. 4 is a detail sectional view taken on the line 4—4 of Fig. 1 showing the means for supporting the brake shoes on the fixed back plate.

A brake mechanism as illustrated in the accompanying drawing is preferably constructed and adapted for use with an automobile vehicle and includes a back plate 10 which is fixed or otherwise secured to a stationary part of the vehicle or chassis and preferably to the axle. A brake drum 11 is secured to the rotating wheel or other movable element with which the braking mechanism is associated and a brake shoe means 12 is preferably mounted internally of the brake drum and arranged to have a predetermined clearance 9 with respect to the brake drum. The brake shoe means is preferably carried by the back plate and for purposes of illustration, I have shown a pair of brake shoes although obviously a single shoe may be used, or more than two, if so desired. A pin 13 is carried by the back plate and links 14 which are pivotally secured to the pin 13, said links connecting the brake shoes with the pin, these links each being pivoted to the web of the brake shoe by means of a pin 15. It will thus be seen that one end of each brake shoe is floatably supported by this link structure and the free ends of the brake shoe are adapted to be secured to a brake shoe actuating mechanism 16. This actuating mechanism may be operated by fluid pressure if desired or any other suitable form of mechanical brake shoe actuating mechanism may be employed. Preferably the actuating mechanism herein illustrated comprises a pair of pressure actuated elements 16ª and 16ᵇ which may be secured to the web portion of the free end of the brake shoe by means of suitable pins or other fastening devices 17.

In order to maintain the clearance between the brake shoe means and the brake drum means approximately constant, I have provided an automatically operated clearance take up device or mechanism which is aadpted to be connected to the brake shoe means and is preferably connected thereto adjacent to or close by the free end of the shoe means. A pin 20 is carried by the back plate 10 and projects inwardly of the brake drum. The clearance take up device is composed of a pair of telescoping structures 21 and 22, and the structure 21 including a pin 23 having an eyelet 24 for engagement with the pin 20. This pin 23 is provided with a tapered portion 25 and the extreme end of the pin remote from the eyelet is externally threaded and has adjustably secured thereon a spring retainer 26. A coil spring 27, seating on this spring retainer bears against a disc 28 and forces the balls 29 up the tapered portion of the pin 23. The telescoping structure 22 is preferably tubular in cross-section and is telescoped about the inner telescoping structure 21 the inner surface of the tubular portion of said structure 22 engaging the balls 29. Any force which extends to collapse these two telescoping structures tends to cause the ball to ride up the tapered portion of the pins and to lock the telescoping members together to prevent any further collapsing movement of the same. Any forces tending to distend these telescoping members tends to cause the balls 29 to ride down the tapered portion of the pin, thus releasing the two telescoping members and permitting the same to relatively move axially.

The outer end of the structure 22 is secured to the web of the brake shoe. A pin 30 is carried by the structure 22 and is engaged in the relatively short slot 31 in the web of the brake shoe. The length of this slot is determined by the amount of clearance required between the brake drum and brake shoe means.

As the braking mechanism is actuated the brake shoes are expanded until the brake lining 32 engages the surface of the brake drum. If for any reason the lining is worn and it becomes necessary to move the shoe a greater distance than is permitted by the slot 31, the end of the slot will engage the pin 30 and exert a force on the structure 22 that will lengthen the clearance take up device, the ball clutch releasing the structures 21 and 22. When the brake shoe or shoes are returned to inoperative position the other end of the slot 31 will engage the pin 30 and further movement of the shoe is prevented because the structures 21 and 22 are locked together by the ball clutch.

With this structure, very minute clearances may be taken up. In fact as the brake linings wear, the excess clearance is constantly taken up, the automatically operated clearance take up device being further and further expanded to compensate for the wear in the brake shoe.

A bracket or guide 35 is riveted or otherwise secured to the back plate 10, said bracket or guide being preferably Z-shaped in cross section. The edge 36 of the guide serves as a cam and is positioned at an angle of approximately 15° to 22° with the horizontal plane, in other words at an angle to the line of force exerted by actuating members of the brake shoe actuating device. Thus as the clearance is taken up the guide engages the clearance take up structure 22 and urges the same downwardly as it is forced outwardly. The shoe which is connected with the structure 22 is forced downwardly as well as outwardly for the purpose of maintaining the shoe in proper adjustment for causing the shoe to engage the brake drum with approximately the same pressure throughout its entire length. The structure 22 above referred to is slotted axially as at 37, the cam portion 36 of the bracket or guide 35 riding in this slot. The outer end of the structure 22 at the bottom of the slot is preferably rounded as at 38 to facilitate the engagement with the guide or cam 35 (see Figs. 2 and 3).

As the brake shoe is adjusted outwardly it will be seen that it is also moved downwardly. The guide thus cooperates with the pivotal link support at the lower end of the shoe connected with said link is also forced radially outwardly when this adjustment takes place to maintain the concentric relation between the brake shoe and brake drum.

Although I have illustrated but one form of my invention and have described in detail but a single application thereof, it will be apparent to those skilled in the art to which my invention pertains, that various modifications and changes may be made therein without departing from the spirit of my invention or from the scope of the appended claims.

What I claim as my invention is:

1. In a brake, the combination of a brake drum means, a brake shoe means arranged to have a predetermined clearance with respect to said brake drum means, means movably supporting one end of said brake shoe means and permitting radial movement of same relative to said brake drum means, brake shoe actuating means engaged with the other end of said brake shoe means, an automatically operated clearance take up device associated with said brake shoe means, said device comprising a pair of pivotally mounted members separated by a plurality of ball members, and means cooperating with said brake shoe supporting means for maintaining the concentric relation between the brake shoe and brake drum means for approximately all degrees of adjustment.

2. In a brake, the combination of a brake drum means, a fixed support, a brake shoe means carried by said support and arranged to have a predetermined clearance with respect to said brake drum means, brake shoe actuating means, and an automatically operated clearance take up device secured at one end to the support and to the brake shoe means at the other end, and cam means carried by the fixed support for engaging said clearance take up device to guide the brake shoe means as the same is adjusted with respect to said brake drum means.

3. In a brake, the combination of a brake drum means a fixed support, a brake shoe means carried by said support and arranged to have a predetermined clearance with respect to said brake drum means, brake shoe actuating means, and an automatically operated clearance take up device secured at one end to the support and to the brake shoe means at the other end, and cam means carried by the fixed support and having a cam face inclined at an angle to the line of force of said brake shoe actuating mechanism, said cam means arranged to be engaged by said clearance take up device for guiding the brake shoe means as the same is adjusted with respect to said brake drum means.

4. In a brake, a drum, a back plate, brake shoes connected to the back plate, means actuating said shoes at adjacent ends thereof for engagement with the drum, an automatic take up device adapted to maintain a predetermined clearance between the drum and brake shoes, said device comprising a pair of telescopic members, and means associated with said take up device and responsive to the movement of one of the telescopic members thereof for moving one of said brake shoes progressively toward the drum to maintain a concentric relation between said shoe and drum.

5. In a brake, a drum, a back plate, brake shoes connected to the back plate, means actuating said shoes at adjacent ends thereof for engagement with the drum, an automatic take up device adapted to maintain a predetermined clearance between the drum and brake shoes, said device comprising a plurality of telescopic members, and means associated with said take up device and responsive to the movement of one of the telescopic members thereof for moving one of said brake shoes progressively toward the drum to maintain a concentric relation between said shoe and drum, said last named means including a cam carried by said plate.

7. In a brake, a drum, a back plate, brake shoes connected to the back plate, means actuating said shoes at adjacent ends thereof for engagement with the drum, an automatic take up device adapted to maintain a predetermined clearance between the drum and brake shoes, said device comprising telescopic members separated by a plurality of ball members, and means associated with said take up device and responsive to the movement of one of the telescopic members thereof for moving one of said brake shoes progressively toward the drum to maintain a concentric relation between said shoe and drum, said last named means including a cam carried by said plate, said cam operatively engaging said take up device.

7. In a brake, a drum, a back plate, brake shoes connected to the back plate, means actuating said shoes at adjacent ends thereof for engagement with the drum, a pivot pin carried by the back plate at a point substantially diametrically opposite said actuated shoe ends, said shoes having pivoting ends adjacent said pin, links respectively pivoted to the pin and pivoting shoe ends, and a cam member guiding said shoes downwardly toward said pin and outwardly with respect to the drum center, said cam member being supported on said back plate in a manner to prevent movement relative to said back plate.

8. In a brake, a drum, a back plate, brake shoes connected to the back plate, means actuating said shoes at adjacent ends thereof for engagement with the drum, a pivot pin carried by the back plate at a point substantially diametrically opposite said actuated shoe ends, said shoes having pivoting ends adjacent said pin, links respectively pivoted to the pin and pivoting shoe ends, and means guiding said shoes downwardly toward said pin and outwardly with respect to the drum center, said last named means including cams fixedly carried by the back plate and respectively acting on said shoes, said last named means further including automatically operated wear take up means for maintaining a constant clearance between said brake shoes and said drum.

9. In a brake, the combination of a brake shoe, a back plate, a pin on said brake shoe, a member pivotally mounted on said back plate and said pin, said member being provided with a cam portion adjacent said pin, and a bracket member secured to said back plate, said bracket member engaging the cam portion of said first mentioned member.

10. In a brake, the combination of a brake shoe, a back plate, a member pivotally mounted on said back plate and said brake shoe, said member being provided with a slot extending longitudinally for a portion of the length of said member, the slot of said member being provided with a cam surface, and a bracket member secured on said back plate, said bracket member being provided with a tongue portion extending within the slot and engaging the cam surface of said first mentioned member.

11. In a brake comprising a friction member, an adjustable wear take up mechanism comprising a pair of telescopic members together with a plurality of ball members therebetween, each of said telescopic members being pivotally mounted, one of said telescopic members being provided with an external tapered portion, the other of said telescopic members being provided with a straight cylindrical bore.

12. In a brake having a wear adjusting mechanism, the combination of a pivotally mounted member provided with an external tapered portion, a member telescopically assembled over said pivotally mounted member, and a plurality of rollable members engaging said pivotally mounted member and said second mentioned member.

13. In a brake having a wear adjusting mechanism, the combination of a member having a straight bore, a member having a conico-cylindrical surface, a telescopic retainer member slidably mounted on said second mentioned member, and a plurality of rollable members engaging the straight bore of said first mentioned member, said rollable members further engaging the conico-cylindrical surface of said second mentioned member, said rollable members being retained by said telescopic retainer member, and resilient means suitably mounted to exert a thrust on said telescopic retainer member to force said rollable members up the conico-cylindrical surface of said second mentioned member.

14. In a brake, the combination of a drum, a back plate, brake shoes, means actuating said brake shoes at adjacent ends thereof for engagement with said drum, means pivotally supporting said brake shoes on said back plate, a cam supported by said back plate and acting on one of said shoes intermediate its actuated end and pivot whereby said brake shoe is progressively guided downwardly with respect to the axis of said drum, and automatically operated wear take up means for maintaining a constant clearance between said brake shoes and said drum, said automatically operated wear take up means being operatively connected with said cam.

JOHN W. TATTER.